US010472116B1

(12) United States Patent
Cagle

(10) Patent No.: US 10,472,116 B1
(45) Date of Patent: Nov. 12, 2019

(54) FOLDABLE BAG HOLDER WITH RETROFITTABLE ATTACHMENTS FOR ADDED FUNCTIONALITY

(71) Applicant: Shawn A Cagle, Daegu (KR)

(72) Inventor: Shawn A Cagle, Daegu (KR)

( * ) Notice: Subject to any disclaimer, the term of this patent is extended or adjusted under 35 U.S.C. 154(b) by 0 days.

(21) Appl. No.: 16/138,508

(22) Filed: Sep. 21, 2018

(51) Int. Cl.

| | |
|---|---|
| ***F16M 11/00*** | (2006.01) |
| ***B65B 67/12*** | (2006.01) |
| ***B65F 1/14*** | (2006.01) |
| *B65F 1/16* | (2006.01) |

(52) U.S. Cl.
CPC ........ *B65B 67/1205* (2013.01); *B65F 1/1415* (2013.01); *B65B 2067/1261* (2013.01); *B65F 1/1646* (2013.01)

(58) Field of Classification Search
CPC .. B65F 1/1415; B65F 2001/061; B65B 67/00; B65B 67/12; B65B 67/1205
See application file for complete search history.

(56) References Cited

U.S. PATENT DOCUMENTS

| | | | | |
|---|---|---|---|---|
| 2,789,781 A * | 4/1957 | Miller | A45C 13/04 | 141/390 |
| 4,223,858 A * | 9/1980 | de Salazar | B65B 67/12 | 248/101 |
| 4,537,377 A * | 8/1985 | Shewchuk | B65B 67/1244 | 248/99 |
| 4,848,709 A * | 7/1989 | Kiniry | B65B 67/1244 | 248/101 |
| 2013/0146722 A1* | 6/2013 | Branham | B65B 67/1211 | 248/97 |
| 2016/0304248 A1* | 10/2016 | Cagle | B65F 1/1415 | |

* cited by examiner

*Primary Examiner* — Amy J. Sterling

(57) ABSTRACT

A foldable bag holder with retrofittable attachments for added functionality includes a first folding bar, a second folding bar, an accessory attachment bar, a swiveling bar, and a bag fastening mechanism. The first folding bar and the second folding bar are positioned opposite each other about the accessory attachment bar. The swiveling bar is positioned adjacent to the first folding bar and the second folding bar, opposite the accessory attachment bar. The first folding bar and the second folding bar allow the foldable bag holder to fold in half for ease of storage and transportation. Once folded, the swiveling bar magnetically bonds to the accessory attachment bar to prevent separation. Interchangeable attachments retrofitted onto the accessory attachment bar add functionality and customize the foldable bag holder for specific tasks. The bag fastening mechanism allows a trashbad to be attached to the foldable bag holder.

9 Claims, 11 Drawing Sheets

FOLDABLE BAG HOLDER WITH RETROFITTABLE ATTACHMENTS FOR ADDED FUNCTIONALITY

FIELD OF THE INVENTION

The present invention generally relates to a foldable bag holder. More specifically, the foldable bag holder having a bag fastening mechanism supports a trash-bag at places with limited space or limited accessibility.

BACKGROUND OF THE INVENTION

The present invention is designed to remedy the usual limitations of wheeled trash cans. More specifically, the present invention is designed to overcome the inability of conventional wheeled trash-cans to travel over rough or uneven terrain found outdoors. Although the wheels make the trash cans somewhat mobile, the wheels are unsuited to travel over unpaved pathways, as those found outdoors. The wheels can easily get stuck in ditches or trenches and are generally unable to roll over muddy or wet terrain. Once loaded, these trash-cans can also become very heavy and difficult to move. In most cases, these trash cans simply cannot be used outdoors. These limitations can be resolved by using a light-weight trash bag holder that supports a trash bag in the open position. There are several apparatuses related to supporting and dispensing a trash-bag; however, other apparatuses do not allow for the versatile range of function of the present invention.

The present invention relates to the field of bag management apparatuses. More specifically, the present invention allows a trash-bag to easily open and close, maximizes its utility, and allows it to be easily stored. Further, the present invention utilizes interchangeable attachments to make the present invention highly adaptable and versatile. Consequently, the wide range of applications make the present invention ideal for the average user. The user can just retrofit interchangeable attachments to add functionality and customize the present invention for specific tasks. Finally, the present invention is collapsible and can be stored easily for use in places with limited space or limited accessibility. Thanks to this simple and robust design, the present invention can be used by anyone.

SUMMARY OF THE INVENTION

The present invention is a foldable bag holder allowing a trash-bag to be hung, mounted, or deployed over rough or uneven terrain unsuited for common wheeled trash-cans. The trash-bag refers to a common plastic trash-bag constructed with a certain degree of flexibility. This allows the trash-bag to stretch and fit over the present invention. The present invention uses a foldable frame to hold the trash-bag open while it is being filled. The foldable frame is also provided with a mounting plate for attaching accessories that augment the functions of the present invention. The accessories adapt the present invention to different situations. For example, a hook attached to a flexible cord may be used to hang the foldable frame from a tree outdoors or from the ceiling inside a building. Alternately, a height-adjustable stand may be used on flat ground or indoors. As the name implies, the foldable frame can be folded in half during transportation or when not in use. The trash-bag is attached to the foldable frame with the help of spring-loaded clamps attached to the sides of the foldable frame. The spring-loaded clamps are long and flat to distribute the weight of the trash-bag over a large surface area.

DETAILED DESCRIPTION OF THE INVENTION

All illustrations of the drawings are for the purpose of describing selected versions of the present invention and are not intended to limit the scope of the present invention.

The present invention is a collapsible trash-bag holder designed for ease of transportation and deployment. In the preferred implementation, the trash-bag holder folds into a folded configuration that can be easily transported and deployed to the desired area. Once deployed, the trash-bag holder suspends a trash bag in the open position, allowing waste to be disposed therein.

Figure 1:
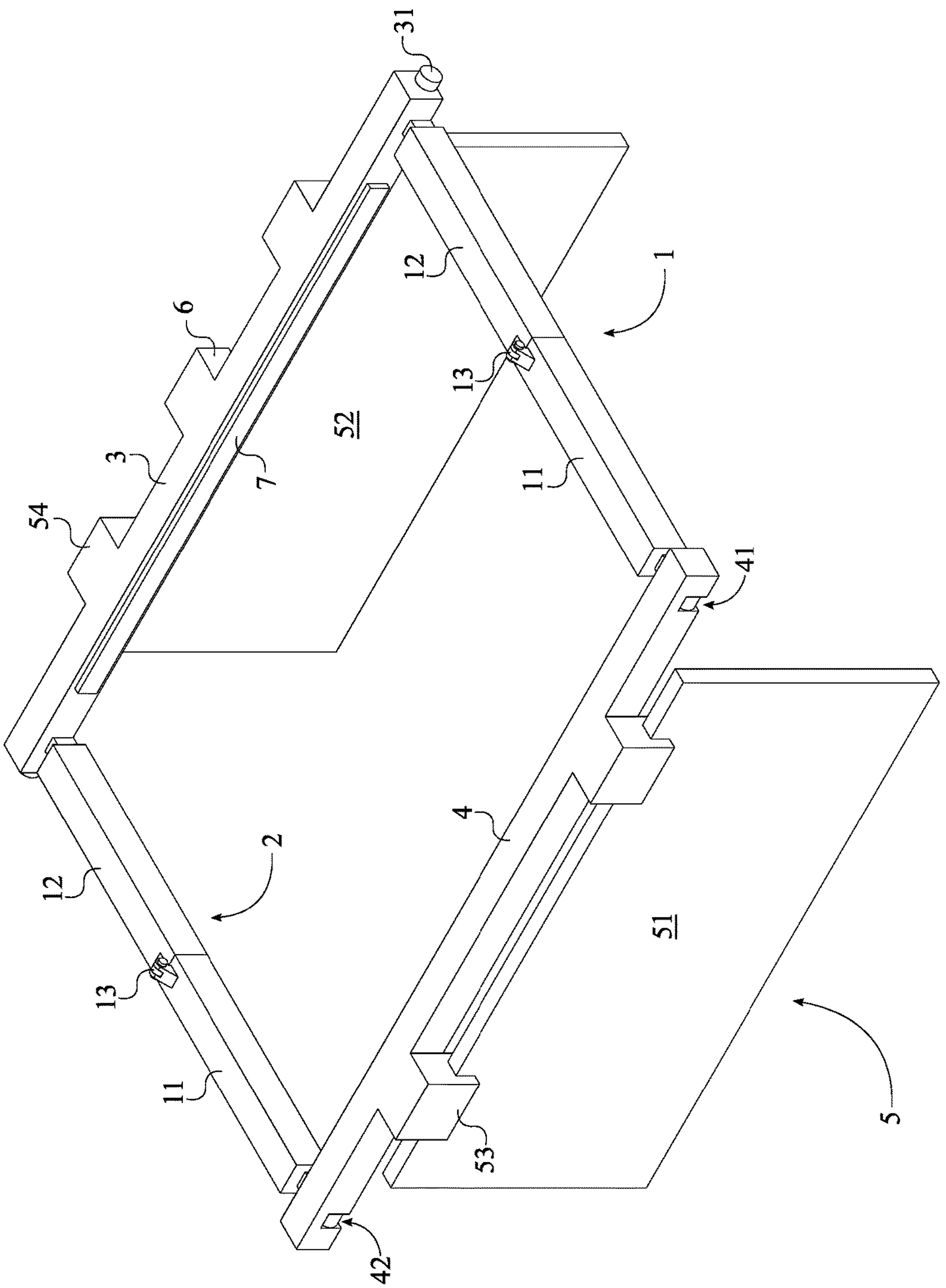
FIG. 1 is a front perspective view of the present invention.

Referring to FIG. 1, the preferred embodiment of the trash-bag holder comprises a first folding bar 1, a second folding bar 2, an accessory attachment bar 3, a swiveling bar 4, and a bag fastening mechanism 5. Accordingly, the first folding bar 1 and the second folding bar 2 are hingedly connected at opposite ends of the accessory attachment bar 3. More specifically, the first folding bar 1 is terminally and hingedly connected to the accessory attachment bar 3. Similarly, the second folding bar 2 is terminally and hingedly connected to the accessory attachment bar 3, opposite the first folding bar 1. On the opposite side of the accessory attachment bar 3, the swiveling bar 4 is hingedly connected to both the first folding bar 1 and the second folding bar 2. More specifically, the swiveling bar 4 is terminally and hingedly connected to the first folding bar 1 opposite the accessory attachment bar 3. Similarly, the swiveling bar 4 is terminally and hingedly connected to the second folding bar 2, opposite the accessory attachment bar 3. "Hingedly", as herein referred to, implies a hinged connection using a barrel and a pin. Alternately, any conventional hinged connection may be utilized in alternate embodiments.

In the preferred embodiment, the trash-bag is perimetrically attached around the trash-bag holder. Moreover, a gap created by the first folding bar 1 and the second folding bar 2 between the accessory attachment bar 3 and the swiveling bar 4, allows waste to be disposed into the trash-bag. To maximize the gap, the first folding bar 1 and the second folding bar 2 are both perpendicularly positioned to the accessory attachment bar 3 and the swiveling bar 4. This gives the trash-bag holder a generally rectangular shape that creates a wide gap for receiving waste. The bag fastening mechanism 5 selectively attaches the trash-bag to the trash-bag holder. More specifically, the bag fastening mechanism 5 is integrated into the accessory attachment bar 3 and the swiveling bar 4. In the preferred embodiment, the bag fastening mechanism 5 comprises rotating panels that push against the interior of the trash-bag. In another possible embodiment, the bag fastening mechanism 5 may comprise tabs, clips, hooks, and/or connectors. In yet another embodiment, the bag fastening mechanism 5 may be integrated into the first folding bar 1 and the second folding bar 2.

Figure 2:
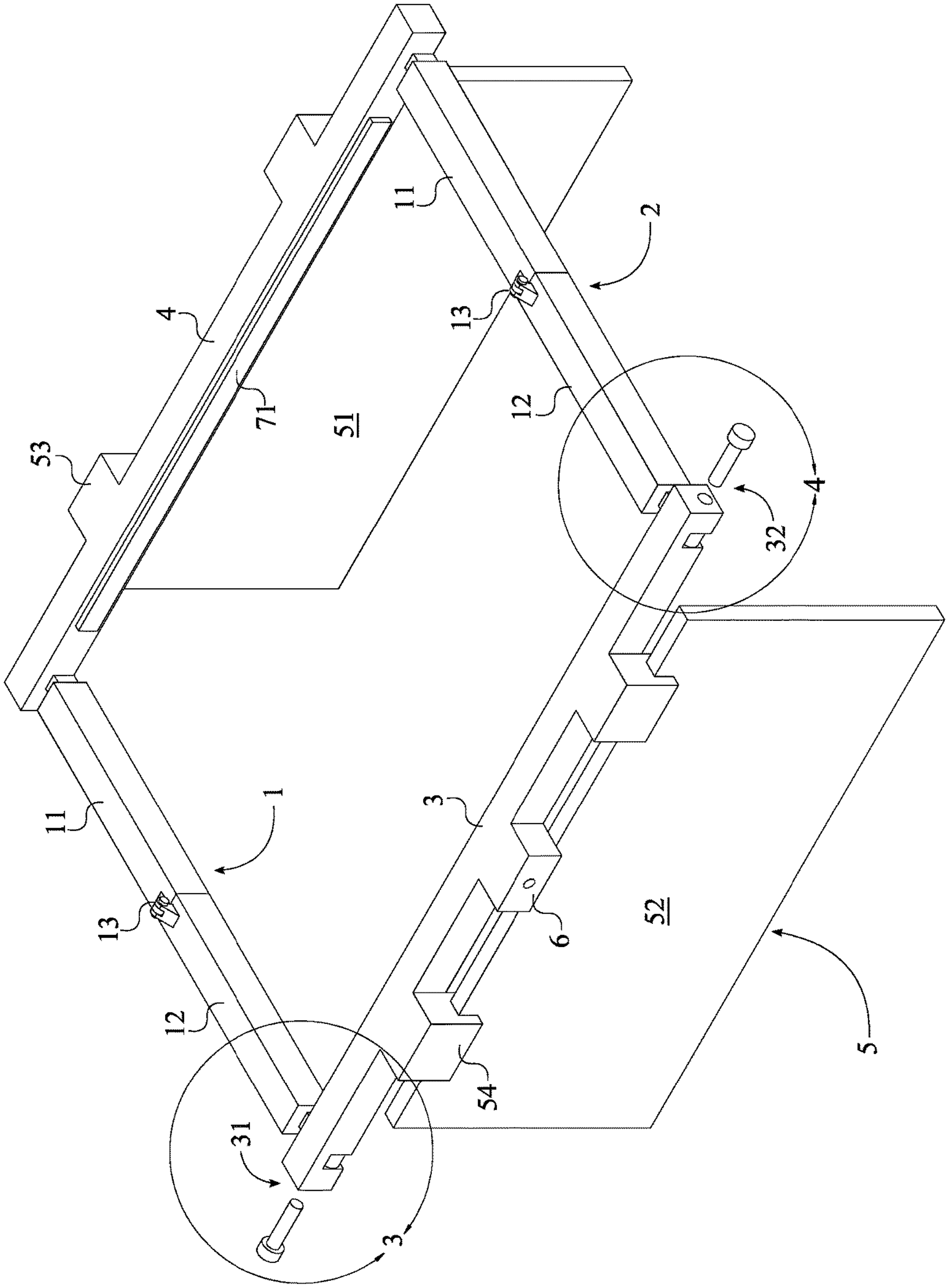
FIG. 2 is a rear perspective view of the present invention.
Figure 5:
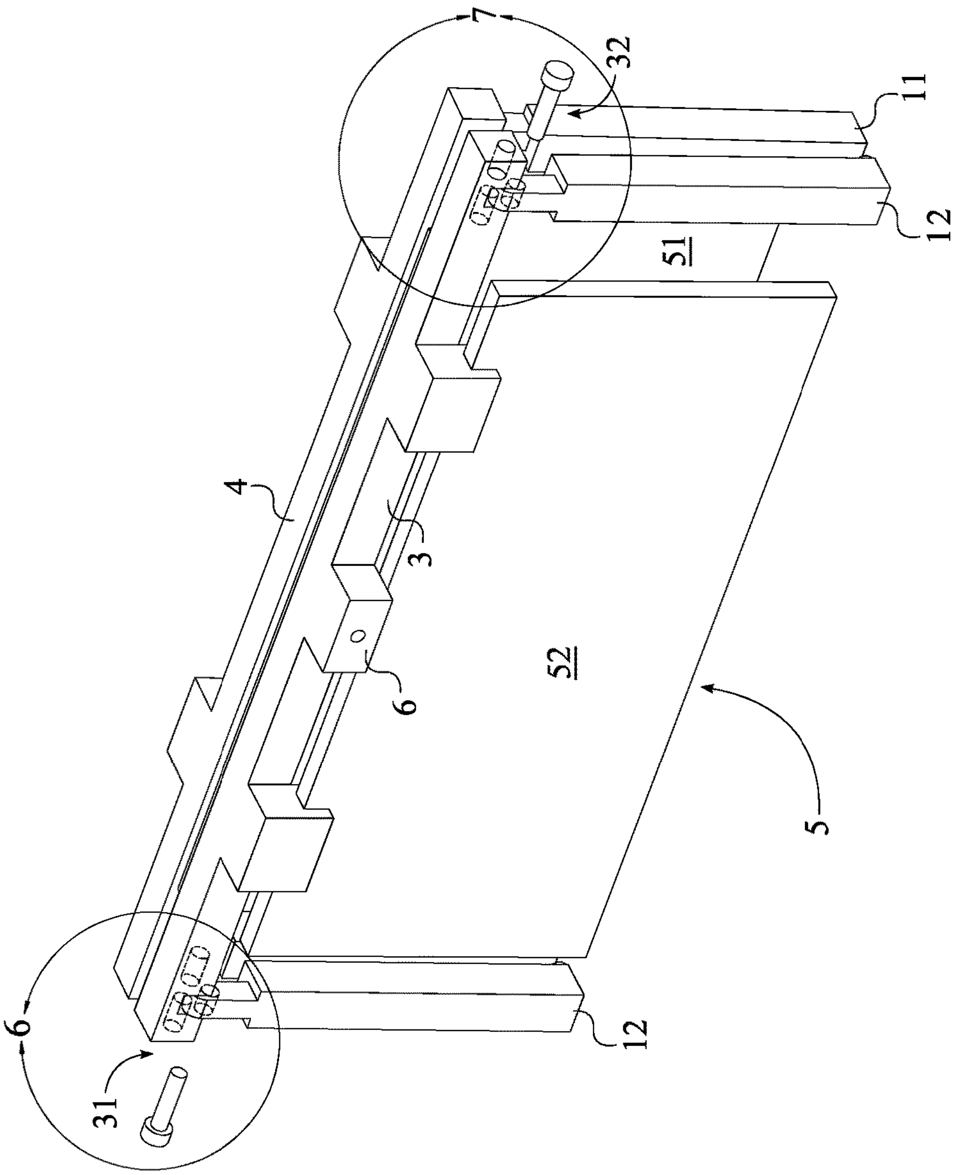
FIG. 5 is a rear perspective view of the present invention in the folded configuration.

Referring to FIG. 2 and FIG. 5, in the preferred embodiment, the first folding bar 1 and the second folding bar 2 fold about a rotation axis oriented perpendicular to the accessory attachment bar 3 and the swiveling bar 4. As such, the first folding bar 1 and the second folding bar 2 each comprises a first pivot arm 11, a second pivot arm 12, and a folding mechanism 13. The first pivot arm 11 and the second pivot arm 12 are solid rectangular bars. Preferably, the first pivot arm 11 is hingedly connected to the second pivot arm 12 by the folding mechanism 13. The folding mechanism 13 allows the first pivot arm 11 to rotate about the second pivot arm 12, thereby folding the first folding bar 1 or the second folding bar 2. By folding the first pivot arm 11 and the second pivot arm 12, the trash-bag holder is converted into a folded configuration for ease of transportation. In contrast, the first folding bar 1 and the second folding bar 2 unfold into a straight position to deploy the trash-bag holder. In the unfolded position, the ends of the first pivot arm 11 and the second pivot arm 12 strike against each other, thereby locking the first folding bar 1 and the second folding bar 2 in a straight position. To fold the first folding bar 1 and the second folding bar 2, an upward force is applied to disengage the ends of the first pivot arm 11 and the second pivot arm 12. Subsequently, the first folding bar 1 and the second folding bar 2 fold until the accessory attachment bar 3 and the swiveling bar 4 contact each other. Accordingly, the first pivot arm 11 is positioned adjacent to the swiveling bar 4. Likewise, the second pivot arm 12 is positioned adjacent to the accessory attachment bar 3.

Referring back to FIG. 1, in the preferred embodiment, the swiveling bar 4 is designed to swivel about the first folding bar 1 and the second folding bar 2. As such, the swiveling bar 4 comprises a first attachment slot 41 and a second attachment slot 42. Preferably, the first attachment slot 41 and the second attachment slot 42 are positioned on opposite ends of the swiveling bar 4. Subsequently, the first pivot arm 11 of the first folding bar 1 is terminally and hingedly connected to the first attachment slot 41. More specifically, the barrel of the first pivot arm 11 is rotatably connected to the pin connected across the first attachment slot 41. Moreover, the first pivot arm 11 of the second folding bar 2 is terminally and hingedly connected to the second attachment slot 42. More specifically, the barrel of the first pivot arm 11 is rotatably connected to the pin connected across the second attachment slot 42. This allows the swiveling bar 4 to remain level as the first folding bar 1 and the second folding bar 2 transition into a folded position.

Figure 3:
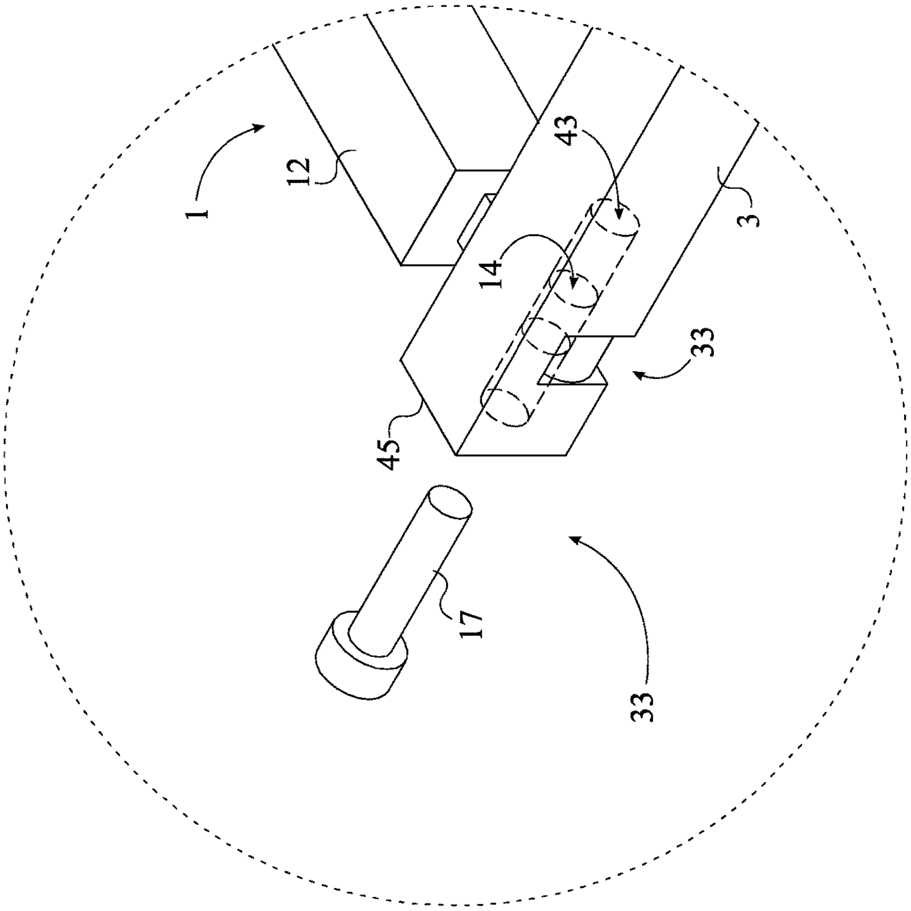
FIG. 3 is a detail view of section 3 in FIG. 2, illustrating the first pin hole and the first locking hole in broken lines and first pin removed from the first pin hole.

Referring to FIG. 2 and FIG. 3, in the preferred implementation, the accessory attachment bar 3 is affixed onto a wall mount or a collapsible stand. As such, a first locking mechanism 31 prevents the accessory attachment bar 3 from rotating about the first folding bar 1 and the second folding bar 2. This positions the trash-bag holder level with the ground. Accordingly, the first locking mechanism 31 comprises a first pin hole 43, a first locking hole 14, and a first pin 17. Further, the accessory attachment bar 3 further comprises a first locking slot 33 that selectively permits the second pivot arm 12 to rotate about the accessory attachment bar 3. The first pin hole 43 traverses into a first distal end 45 of the accessory attachment bar 3. Likewise, the first locking hole 14 traverses through the second pivot arm 12, opposite the folding mechanism 13. The first locking hole 14 is aligned parallel to the first pin hole 43 to create a smooth transition between the second pivot arm 12 and the accessory attachment bar 3. This allows the first pin 17 to easily slide in and out of the first pin hole 43 and the first locking hole 14. Accordingly, the first pin 17 traverses through the first pin hole 43 and the first locking hole 14 from the first distal end 45. This creates an interlocking engagement between the second pivot arm 12 and the accessory attachment bar 3. Further, the second pivot arm 12 is also rotatably mounted into the first locking slot 33. This allows the second pivot arm 12 to rotate about the accessory attachment bar 3 once the first pin 17 is removed.

Figure 4:
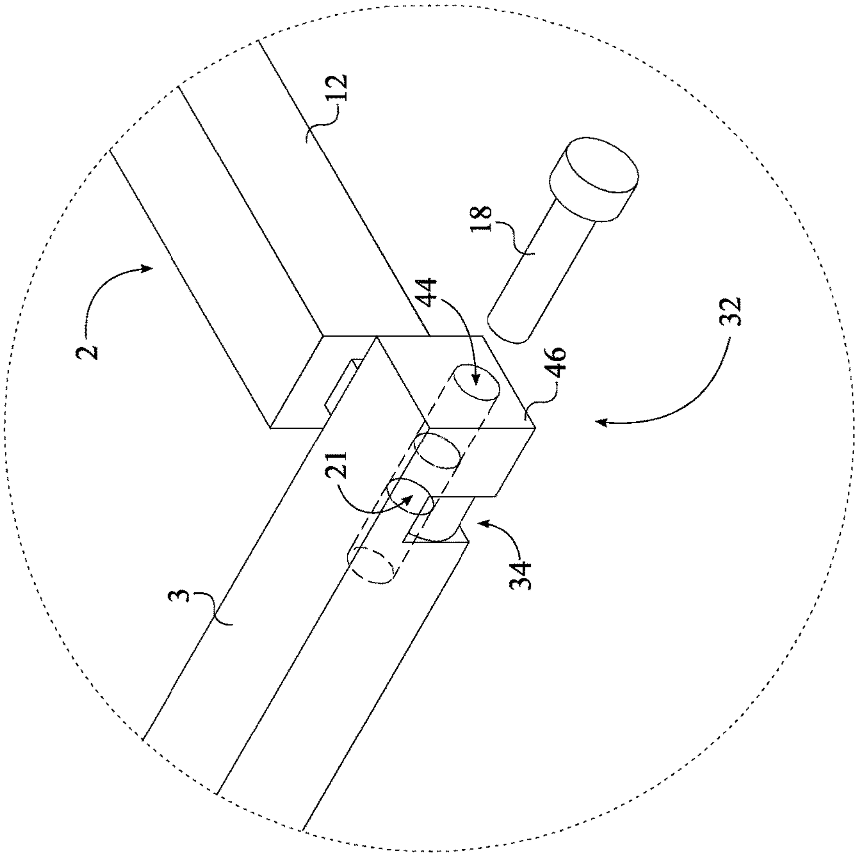
FIG. 4 is a detail view of section 4 in FIG. 2, illustrating the second pin hole and the second locking hole in broken lines and second pin removed from the second pin hole.

Referring to FIG. 2 and FIG. 4, a second locking mechanism 32 is provided opposite the first locking mechanism 31 which prevents the second folding bar 2 from rotating about the accessory attachment bar 3. Accordingly, the second locking mechanism 32 comprises a second pin hole 44, a second locking hole 21, and a second pin 18. Further, the accessory attachment bar 3 comprises a second locking slot 34 that selectively permits the second pivot arm 12 to rotate about the accessory attachment bar 3. The second pin hole 44 traverses into a second distal end 46 of the accessory attachment bar 3. Likewise, the second locking hole 21 traverses through the second pivot arm 12, opposite the folding mechanism 13. The second locking hole 21 is aligned parallel to the second pin hole 44 to create a smooth transition between the second pivot arm 12 and the accessory attachment bar 3. This allows the second pin 18 to easily slide in and out of the second pin hole 44 and the second locking hole 21. Accordingly, the second pin 18 traverses through the second pin hole 44 and the second locking hole 21 from the second distal end 46. This creates an interlocking engagement between the second pivot arm 12 and the accessory attachment bar 3. Further, the second pivot arm 12 is also rotatably mounted into the second locking slot 34. This allows the second pivot arm 12 to rotate about the accessory attachment bar 3 once the second pin 18 is removed. With the aid of the first locking mechanism 31 and the second locking mechanism 32, both the first folding bar 1 and the second folding bar 2 are fixed with the accessory attachment bar 3.

Referring back to FIG. 1 and FIG. 2, the preferred embodiment of the bag fastening mechanism 5 comprises a first securing panel 51, a second securing panel 52, a first rotation mechanism 53, and a second rotation mechanism 54. The first securing panel 51 and the second securing panel 52 push against the opening of the trash-bag for receiving waste. As such, the first securing panel 51 and the second securing panel 52 are positioned on opposite sides of the trash-bag holder. Accordingly, the first rotation mechanism 53 is mounted adjacent to the swiveling bar 4. Similarly, the second rotation mechanism 54 is mounted adjacent to the accessory attachment arm. To fit the trash-bag over the bag fastening mechanism 5, the first securing panel 51 and the second securing panel 52 are pinched together to fit into the opening of the trash-bag. Accordingly, the first securing panel 51 is hingedly connected to the first rotation mechanism 53. Likewise, the second securing panel 52 is hingedly connected to the second rotation mechanism 54. Preferably, the first rotation mechanism 53 and the second rotation mechanism 54 are spring-loaded hinges. Once the trash-bag is fitted over the bag fastening mechanism 5, the spring-loaded hinge expands back to its uncompressed state, thereby entrapping the first securing panel 51 and the second securing panel 52 between opening of the trash-bag.

Referring to FIG. 1, FIG. 2, and FIG. 5, in the preferred embodiment, the trash-bag holder collapses into a folded configuration that can be easily transported. In the folded configuration, the first folding bar 1 and the second folding bar 2 fold in half to retract the swiveling bar 4 towards the accessory attachment bar 3. As previously mentioned, both the accessory attachment bar 3 and the swiveling bar 4 are hinged to maintain a generally upright position in relation to the ground. This allows a first magnetic plate 7 of the accessory attachment bar 3 and a second magnetic plate 71 of the swiveling bar 4 to be positioned coincident to each other.

Further, the swiveling bar 4 and the accessory attachment bar 3 are magnetically bonded to prevent separation during transportation. As such, the first magnetic plate 7 is connected along the accessory attachment bar 3. Further, the first magnetic plate 7 is oriented towards the swiveling bar 4. Similarly, the second magnetic plate 71 is provided on the swiveling bar 4. Further, the second magnetic plate 71 is connected along the swiveling bar 4. The second magnetic plate 71 is oriented towards the accessory attachment bar 3. The first magnetic plate 7 and the second magnetic plate 71 can thus form a magnetic bond with each other.

Figure 6:
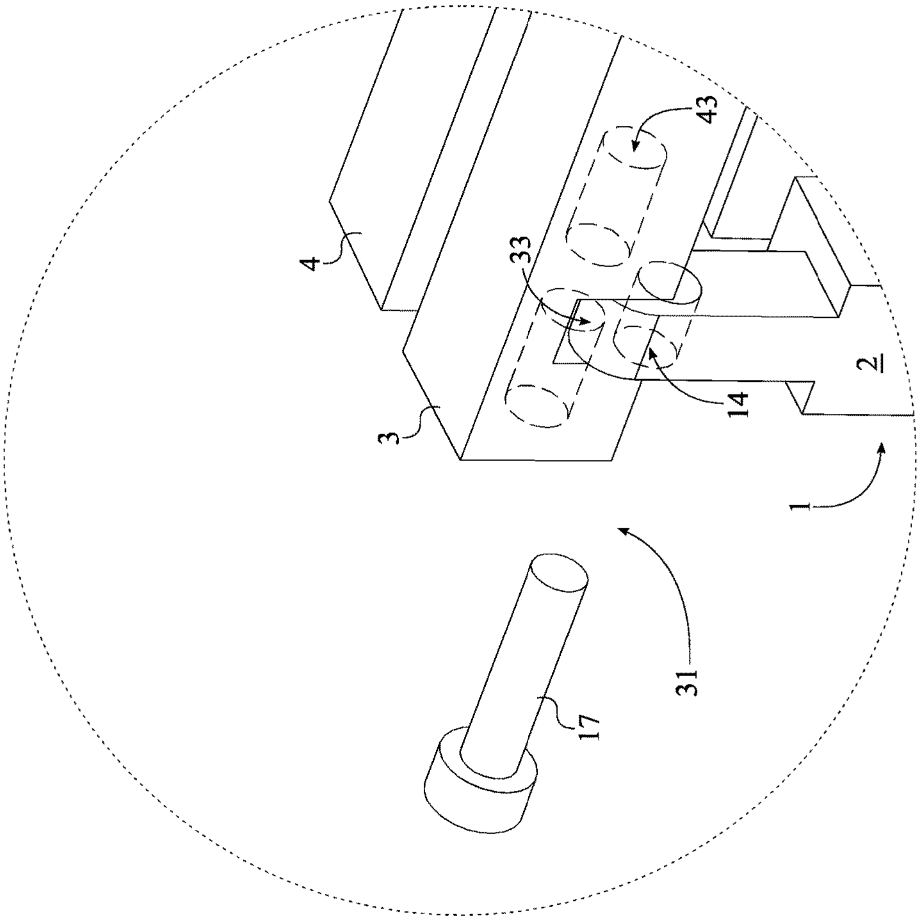
FIG. 6 is a detail view of section 6 in FIG. 6, illustrating the first pin hole and the first locking hole in broken lines to emphasize the offset between the first pin hole and the first locking hole.
Figure 7:
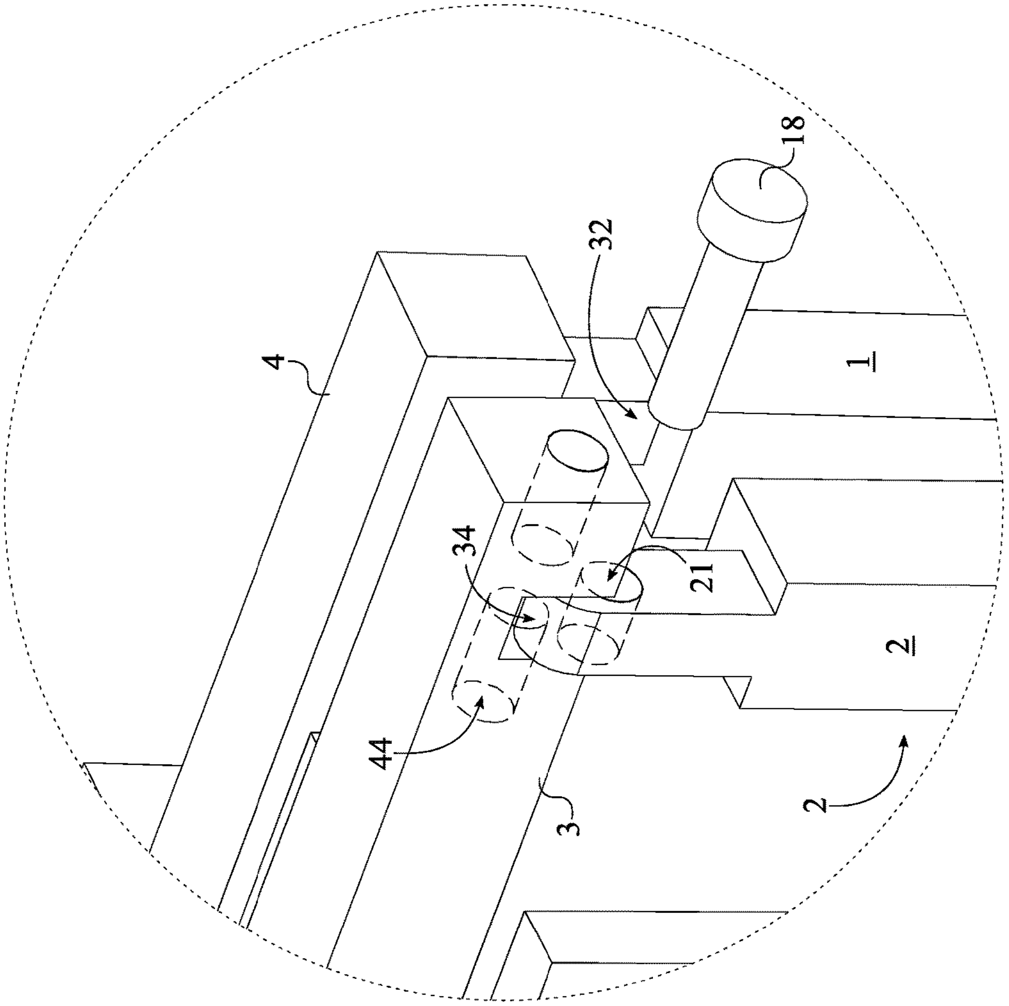
FIG. 7 is a detail view of section 7 in FIG. 6, illustrating the second pin hole and the second locking hole in broken lines to emphasize the offset between the second pin hole and the second locking hole.

Referring to FIG. 6 and FIG. 7, to collapse the trash-bag holder, the first pin 17 and second pin 18 are removed from the first pin hole 43 and the second pin hole 44 respectively. This allows the second pivot arm 12 to rotate within the first attachment slot 33. Similarly, the second pivot arm 12 rotates within the second attachment slot 34. In the folded configuration, the first pin hole 43 and the second pin hole 44 are offset from the first locking hole 14 and the second locking hole 21, respectively. To reengage the first locking mechanism 31, the first folding bar 1 is unfolded into a straight position, thereby realigning the first locking hole 43 with the first pin hole 14. Similarly, the second folding bar 2 is unfolded into a straight position, thereby realigning the second locking hole 44 with the second pin hole 21. This also creates a clear passage for the first pin 17 and the second pin 18 within the accessor attachment bar 3.

Figure 8:
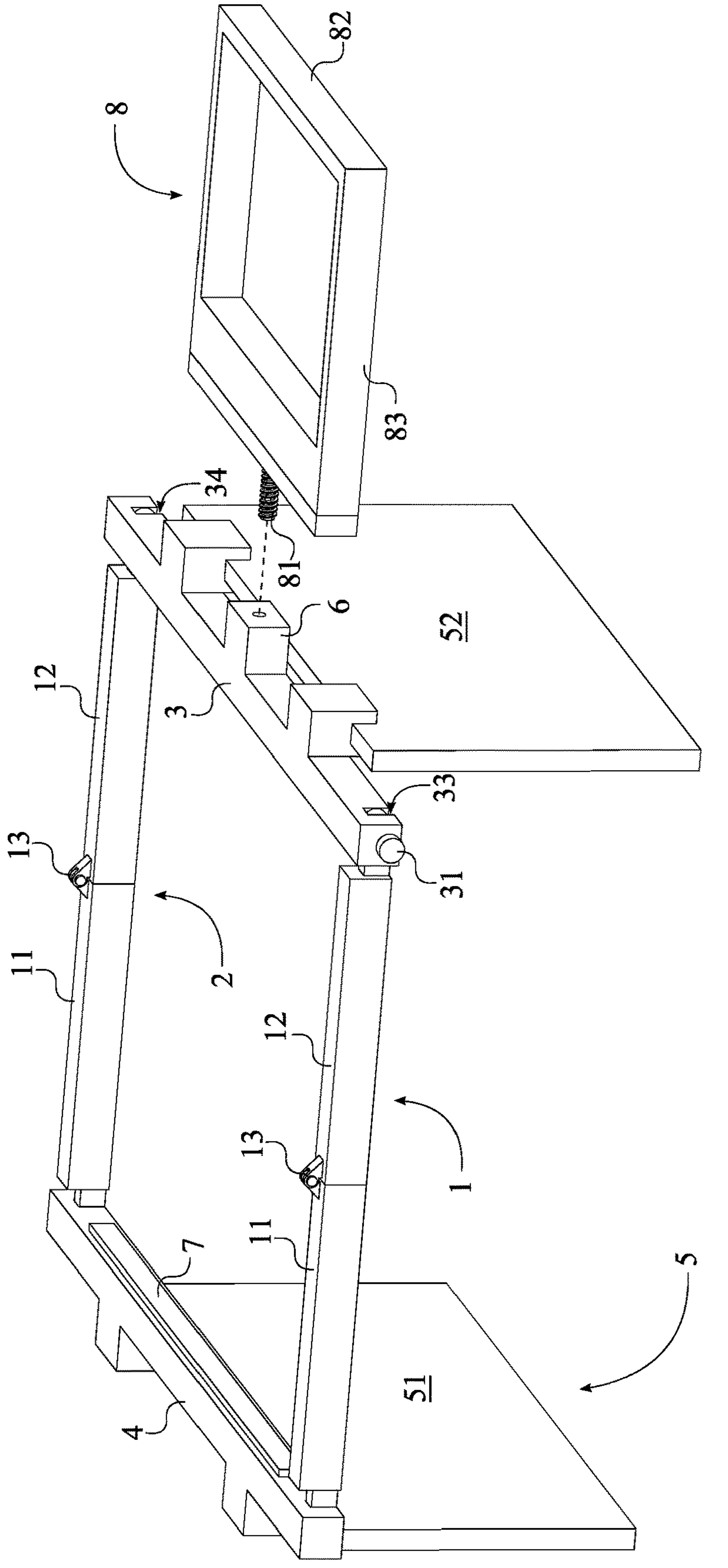
FIG. 8 is a side perspective view of the present invention illustrating the detachable handle detached from the mounting bracket.

Referring to FIG. 8. preferably, a mounting bracket 6 allows a plurality of accessories to be attached to the accessory attachment bar 3. The preferred mounting bracket 6 may comprise a threaded hole allowing an accessory to be screwed into the accessory attachment bar 3. Alternately, the mounting bracket 6 may employ magnets, snaps, tabs, and/or the like. The mounting bracket 6 is connected adjacent to the accessory attachment bar 3. Further, the mounting bracket 6 is positioned opposite the swiveling bar 4. This allows the accessory to be mounted adjacent to the trash-bag holder, offset from the opening of the trash-bag.

In one possible embodiment, the accessory may be a detachable handle 8. The detachable handle 8 allows the user to easily carry and transport the trash-bag holder in the folded configuration. The preferred detachable handle 8 comprises a threaded rod 81, a main structure 83, and a grip 82. The grip 82 is a solid rectangular bar that may be fashioned with finger holds. The main structure 83 is a U-shaped frame comprising a pair of parallel members connected together by a cross frame. The threaded rod 81 is terminally connected onto the main structure 83. More specifically, the threaded member may be connected onto the cross frame. Similarly, the grip 82 is terminally connected onto the main structure 83, opposite the threaded rod 81. More specifically, the grip 82 is mounted between the pair of parallel members. This creates a space between the parallel members for the user's hand. Finally, the threaded rod 81 is attached to the mounting bracket 6, opposite of the main structure 83. Preferably, the threaded rod 81 is screwed to the mounting plate.

Figure 9:
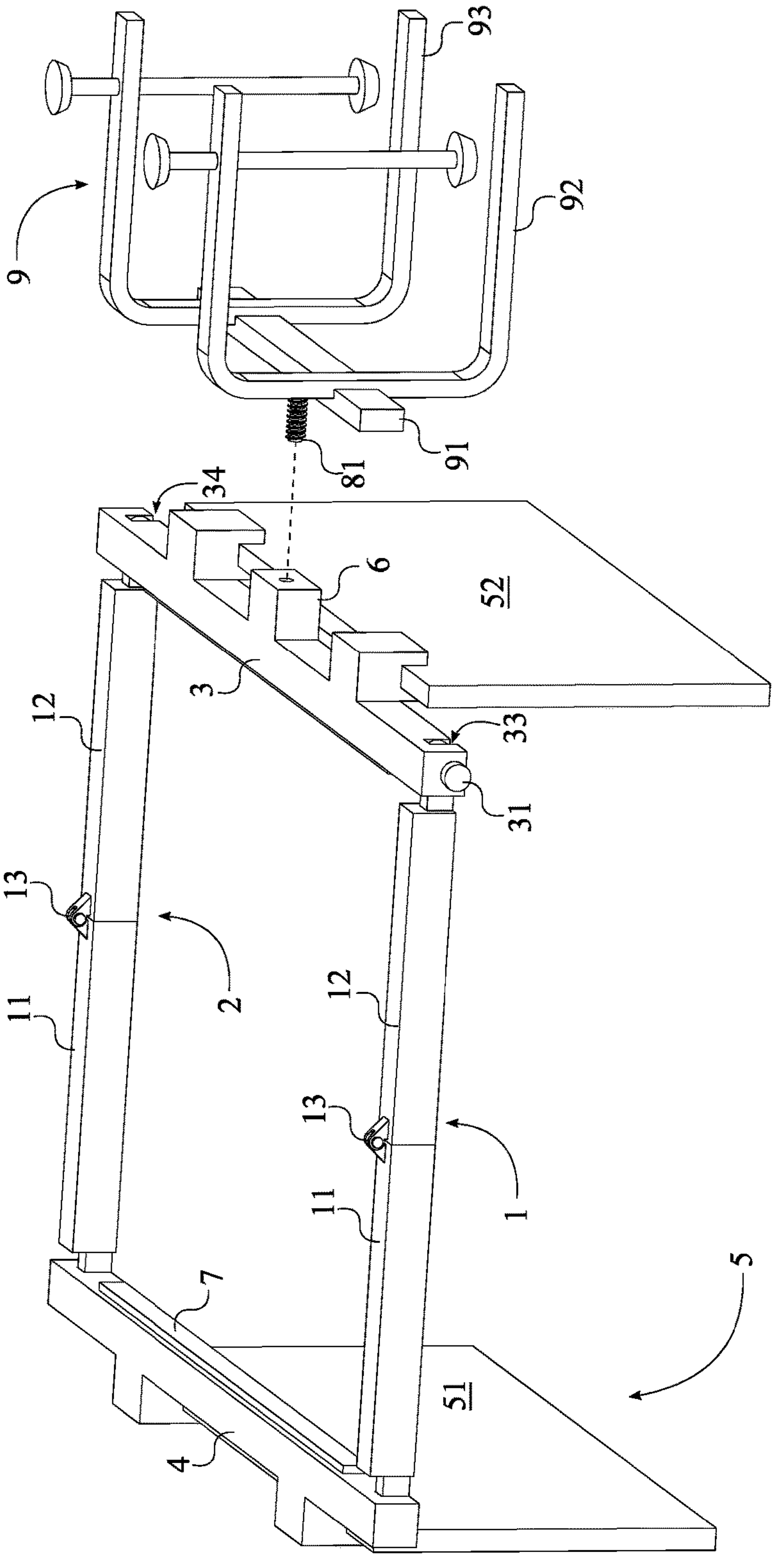
FIG. 9 is a side perspective view of the present invention illustrating the adjustable clamp detached from the mounting bracket.

Referring to FIG. 9. in another possible embodiment, an adjustable clamp 9 allows the trash-bag holder to be mounted onto an overhang of a table. The preferred embodiment of the adjustable clamp 9 comprises a crossbar 91, a first C-clamp 92, a second C-clamp 93, and a threaded rod 81. The first C-clamp 92 and the second C-clamp 93 comprise a tightening rod for creating a tight fit between the overhang and the respective C-clamp. Accordingly, the first C-clamp 92 is connected adjacent to the crossbar 91. Similarly, the second C-clamp 93 is terminally connected to the crossbar 91, opposite the first C-clamp 92. Preferably, the threaded rod 81 is connected adjacent to the crossbar 91. Further, the threaded rod 81 is positioned between the first C-clamp 92 and the second C-clamp 93. This positions the threaded rod 81 into the center of the adjustable clamp 9, thereby protecting the crossbar 91 from twisting forces created by uneven application of force. Finally, the threaded rod 81 is attached to the mounting bracket 6, opposite of the first C-clamp 92 and the second C-clamp 93. Accordingly, the overhang is attached to the adjustable clamp 9, opposite the trash-bag holder.

Figure 10:
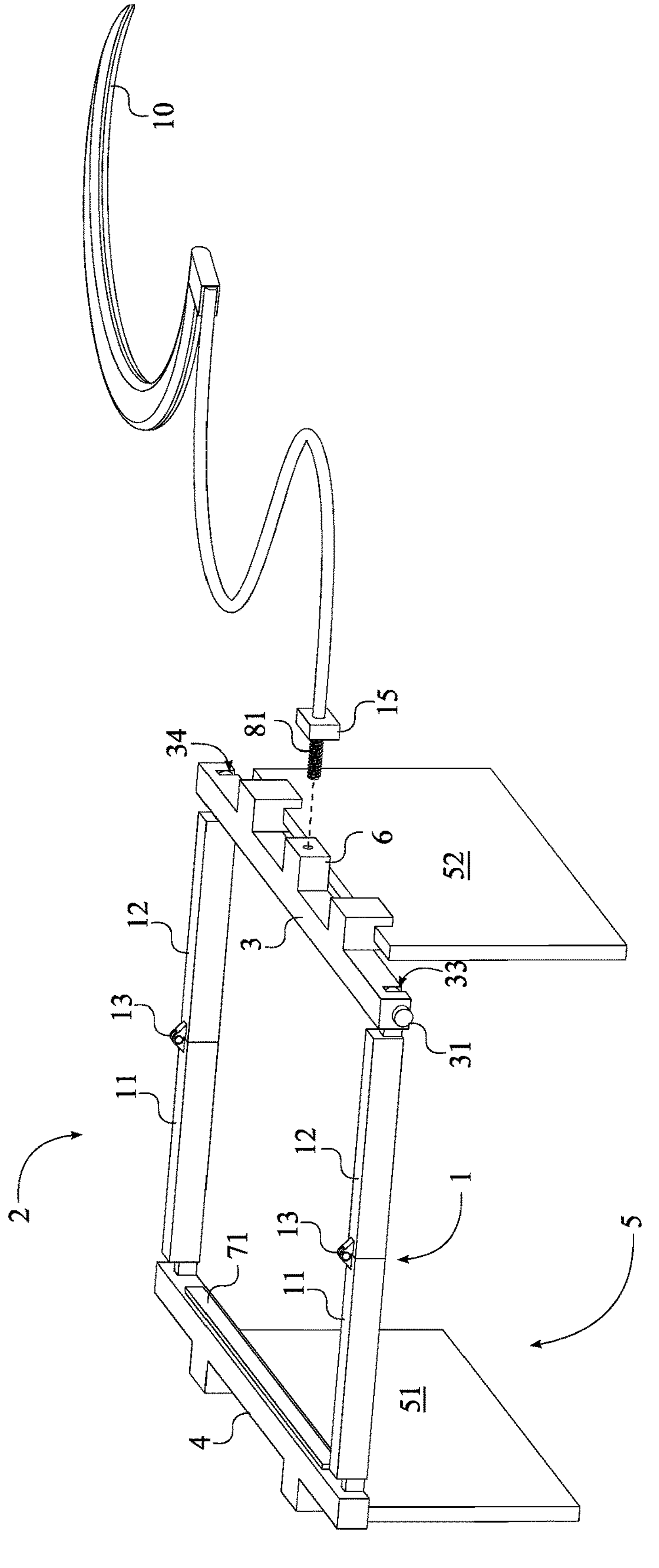
FIG. 10 is a side perspective view of the present invention illustrating the mounting hook detached from the mounting bracket.

Referring to FIG. 10. in yet another embodiment, a mounting hook 10 allows the trash-bag to hand freely over the ground. For example, the mounting hook 10 may allow the trash-bag holder to be hung indoors on objects such as the piping or a door frame. Accordingly, a base plate 15 and a threaded rod 81 allows the mounting hook 10 to attach to the trash-bag holder. The mounting hook 10 is connected to the base plate 15 by a flexible cord. The length of the flexible cord is determined by the height of the object which the mounting hook 10 hooks onto. The threaded rod 81 is terminally connected to the base plate 15, opposite the flexible cord. Further, the threaded rod 81 is attached to the mounting bracket 6, opposite of the base plate 15. As such, the threaded rod 81 is screwed into the mounting plate to ensure the trash-bag holder remains attached to the flexible cord even with large loads.

Figure 11:
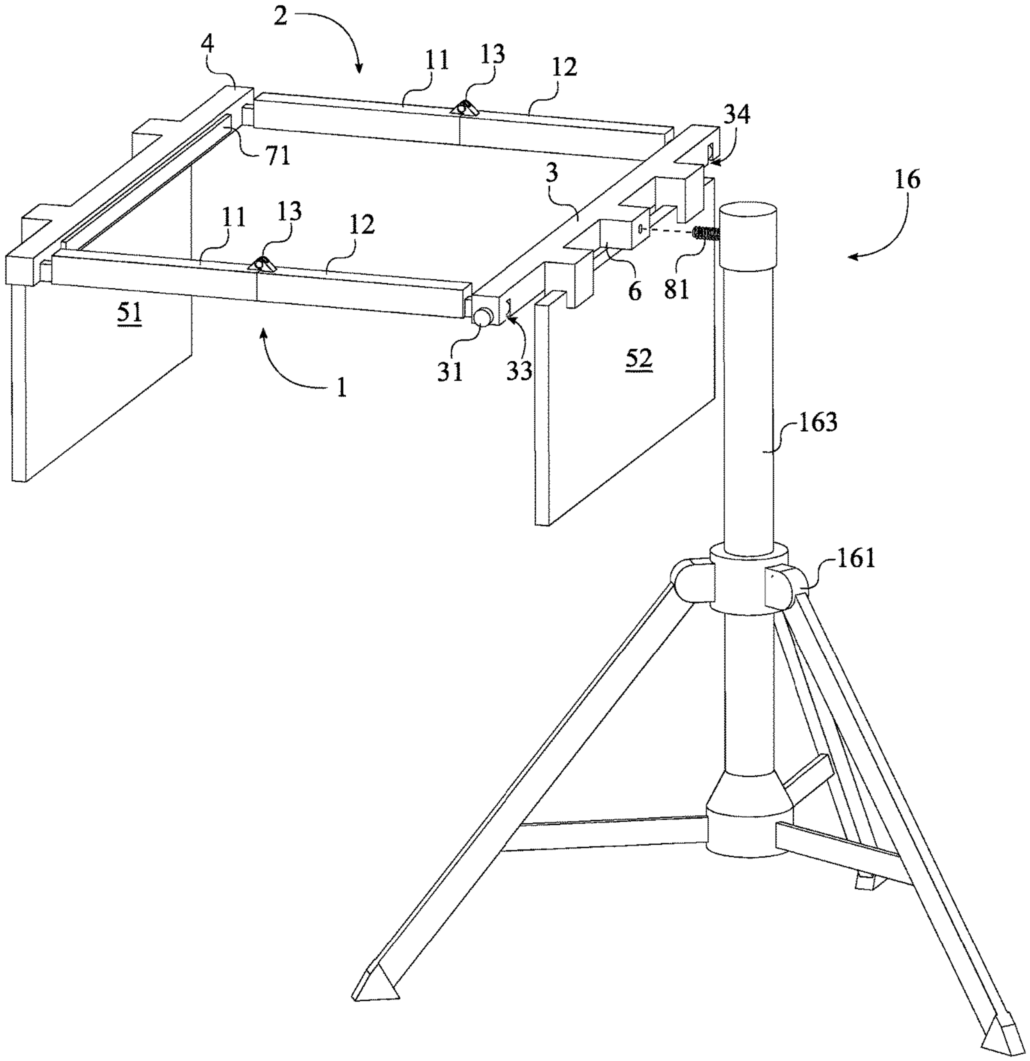
FIG. 11 is a side perspective view of the present invention illustrating the height-adjustable stand detached from the mounting bracket.

Referring to FIG. 11. in yet another embodiment, a height-adjustable stand 16 is provided. The height-adjustable stand 16 comprises a tripod assembly 161, a threaded rod 81, and a sliding pole 163. The tripod assembly 161 supports the sliding pole 163 into an upright position. As such, the sliding pole 163 is mounted into the tripod assembly 161. The preferred tripod assembly 161 comprises a plurality of angle-adjustable legs. By changing the angles of the plurality of angle-adjustable legs, the height of the sliding pole 163 can be adjusted. As in other accessories, the threaded rod 81 allows the height-adjustable stand 16 to attach to the trash-bag holder. As such, the threaded rod 81 is terminally connected to the sliding pole 163, opposite the tripod assembly 161. Accordingly, the threaded rod 81 is attached to the mounting bracket 6, opposite of the sliding pole 163. As such, the trash-bag holder is positioned terminally on the sliding pole 163, opposite the tripod assembly 161.

Although the invention has been explained in relation to its preferred embodiment, it is to be understood that many other possible modifications and variations can be made without departing from the spirit and scope of the invention as hereinafter claimed.

What is claimed is:

1. A folding bag holder with accessories for added functionality comprising:
- a first folding bar;
- a second folding bar;
- an accessory attachment bar;
- a swiveling bar;
- a first pin;
- a second pin;
- a bag fastening mechanism;
- the first folding bar being terminally and hingedly connected to the accessory attachment bar;
- the second folding bar being terminally and hingedly connected to the accessory attachment bar;
- the first folding bar and the second folding bar being oppositely located to each other;
- the swiveling bar being terminally and hingedly connected to the first folding bar;
- the swiveling bar being terminally and hingedly connected to the second folding bar;
- the accessory attachment bar and the swiveling bar being oppositely located to each other;
- the first folding bar and the second folding bar being perpendicularly positioned to the accessory attachment bar and the swiveling bar;
- the first folding bar and the second folding bar each comprising a first pivot arm, a second pivot arm, a folding mechanism and a locking hole, the first pivot arm being hingedly connected to the second pivot arm by the folding mechanism, the first pivot arm being adjacently positioned to the swiveling bar, the second pivot arm being adjacently positioned to the accessory attachment bar, the locking hole traversing through the second pivot arm, the locking hole being oppositely located to the folding mechanism;
- the swiveling bar comprising a first attachment slot and a second attachment slot;
- the first pivot arm of the first folding bar being terminally and hingedly connected to the first attachment slot;
- the first pivot arm of the second folding bar being terminally and hingedly connected to the second attachment slot;
- the accessory attachment bar comprising a first locking slot, a second locking slot, a first distal end, a second distal end, a first pin hole and a second pin hole;
- the second pivot arm of the first folding bar being rotatably mounted into the first locking slot;
- the first pin hole traversing into the first distal end;
- the locking hole of the first folding bar being configured to be aligned parallel to the first pin hole;
- the first pin being configured to be inserted into the first pin hole and the locking hole of the first folding bar in response to the locking hole of the first folding bar being aligned parallel to the first pin hole;
- the second pivot arm of the second folding bar being rotatably mounted into the second locking slot;
- the second pin hole traversing into the second distal end;
- the locking hole of the second folding bar being configured to be aligned parallel to the second pin hole;
- the second pin being configured to be inserted into the second pin hole and the locking hole of the second folding bar in response to the locking hole of the second folding bar being aligned parallel to the second pin hole; and
- the bag fastening mechanism being integrated into the accessory attachment bar and the swiveling bar.

2. The folding bag holder with accessories for added functionality as claimed in claim 1 comprising:
- the bag fastening mechanism comprising a first securing panel, a second securing panel, a first rotation mechanism and a second rotation mechanism;
- the first rotation mechanism being mounted adjacent to the swiveling bar;
- the second rotation mechanism being mounted adjacent to the accessory attachment arm;
- the first securing panel being hingedly connected to the first rotation mechanism; and
- the second securing panel being hingedly connected to the second rotation mechanism.

3. The folding bag holder with accessories for added functionality as claimed in claim 1 comprising:
- a first magnetic plate;
- the first magnetic plate being connected along the accessory attachment bar; and
- the first magnetic plate being oriented towards the swiveling bar.

4. The folding bag holder with accessories for added functionality as claimed in claim 3 comprising:
- a second magnetic plate;
- the second magnetic plate being connected along the swiveling bar; and
- the second magnetic plate being oriented towards the accessory attachment bar.

5. The folding bag holder with accessories for added functionality as claimed in claim 1 comprises:
- a mounting bracket;
- the mounting bracket being connected adjacent to the accessory attachment bar; and
- the mounting bracket being positioned opposite to the swiveling bar.

6. The folding bag holder with accessories for added functionality as claimed in claim 5 comprises:
- a detachable handle;
- the detachable handle comprises a threaded rod, a main structure, and a grip;
- the threaded rod being terminally connected onto the main structure;
- the grip being terminally connected onto the main structure, opposite the threaded rod; and
- the threaded rod being attached to the mounting bracket, opposite of the main structure.

7. The folding bag holder with accessories for added functionality as claimed in claim 5 comprises:
- an adjustable clamp;
- the adjustable clamp comprises a crossbar, a first C-clamp, a second C-clamp, and a threaded rod;
- the first C-clamp being terminally connected to the crossbar;
- the second C-clamp being terminally connected to the crossbar, opposite the first C-clamp;
- the threaded rod being connected adjacent to the crossbar;

the threaded rod being positioned between the first C-clamp and the second C-clamp; and
the threaded rod being attached to the mounting bracket, opposite of the first C-clamp and the second C-clamp.

8. The folding bag holder with accessories for added functionality as claimed in claim 5 comprises:
a mounting hook;
a base plate;
a threaded rod;
the mounting hook being connected to the base plate by a flexible cord;
the threaded rod being terminally connected to the base plate, opposite the flexible cord; and
the threaded rod being attached to the mounting bracket, opposite of the base plate.

9. The folding bag holder with accessories for added functionality as claimed in claim 5 comprises:
a height-adjustable stand;
the height-adjustable stand comprises a tripod assembly, a threaded rod, and a sliding pole;
the sliding pole being mounted into the tripod assembly;
the threaded rod being terminally connected to the sliding pole, opposite the tripod assembly; and
the threaded rod being attached to the mounting bracket, opposite of the sliding pole.

* * * * *